(12) United States Patent
Lev (10) Patent No.: US 12,360,876 B2
(45) Date of Patent: Jul. 15, 2025

(54) COMPUTER RESOURCE MONITORING BY PROCESSING IMAGES USING A MODEL COMPRISING LARGE LANGUAGE MODELS

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 159 days.

(21) Appl. No.: 18/195,983

(22) Filed: May 11, 2023

(65) Prior Publication Data

US 2024/0378128 A1 Nov. 14, 2024

(51) Int. Cl.
*G06V 10/764* (2022.01)
*G06F 11/34* (2006.01)

(52) U.S. Cl.
CPC ........ *G06F 11/3438* (2013.01); *G06V 10/764* (2022.01)

(58) Field of Classification Search
CPC ...................................................... G06F 9/451
See application file for complete search history.

(56) References Cited

U.S. PATENT DOCUMENTS

| | | | |
|---|---|---|---|
| 11,019,015 B1* | 5/2021 | Shapira | H04L 51/52 |
| 2020/0159770 A1* | 5/2020 | Zhang | G06F 16/90332 |
| 2021/0020059 A1* | 1/2021 | Xue | G09B 7/02 |
| 2021/0142763 A1* | 5/2021 | Notani | G09G 5/08 |
| 2023/0350936 A1* | 11/2023 | Alayrac | G06N 3/0475 |

* cited by examiner

*Primary Examiner* — Di Xiao (57) ABSTRACT

A system and a method for classifying images pertaining to computer resource usage of a user, using an ensemble of close ended questions and a neural network based language model. The method may be used to as aid to monitor and/or enforce computer usage policies in industrial organizations, government services, academy, education, and/or the like.

13 Claims, 5 Drawing Sheets

510 Is the the text "storing a plurality of first values generated when feeding a first data record to the layered machine learning model" entertaining?

520 The text "storing a plurality of first values generated when feeding a first data record to the layered machine learning model" is not typically considered entertaining in the traditional sense of the word. It is a technical description of a process related to machine learning, which may be interesting or informative to those with a background in this field. However, it is not likely to be entertaining in the way that a novel, movie, or television show might be.

530 Is the the text "storing a plurality of first values generated when feeding a first data record to the layered machine learning model" related to programming?

540 Yes, the text "storing a plurality of first values generated when feeding a first data record to the layered machine learning model" is related to programming, specifically in the field of machine learning. It describes a process in which a machine learning model is fed a data record and generates a plurality of first values, which are then stored for future use. This is a common technique in machine learning programming and is used to improve the accuracy and effectiveness of machine learning models.

550 Is the acronym or logo "bbc" related to programming?

560 While the acronym "BBC" has various meanings depending on the context, it is not inherently related to programming or computer science.

In some cases, "BBC" may refer to the British Broadcasting Corporation, which is a public broadcaster in the United Kingdom that produces news, entertainment, and educational content across various media platforms including television, radio, and online.

However, if you are asking whether the BBC has a presence in the programming or computer science industries, the answer is that it does have some involvement in these areas. The BBC has a technology division that develops software and hardware products, and it has also launched initiatives to promote digital literacy and coding skills among young people. But in general, the acronym "BBC" is not typically associated with programming or computer science in the same way as other acronyms such as "API" or "SDK."

Regenerate response

FIG. 5

COMPUTER RESOURCE MONITORING BY PROCESSING IMAGES USING A MODEL COMPRISING LARGE LANGUAGE MODELS

FIELD AND BACKGROUND OF THE INVENTION

The present invention, in some embodiments thereof, relates to text classification, and, more particularly, but not exclusively, monitoring computing resource usage by processing images using a model comprising a conversational language models.

Computing resource may be allocated to students, employees and customers under certain conditions and limitations.

For example, a web service may restrict use of sensitive content, or allocate a resource only for research, or be required to prevent activities of questionable legitimacy. Furthermore, an employer or a university may expect an employee or a student to refrain from using their computing resources for personal entertainment.

Some prior art may search for sensitive words, however users may quickly learn which words are being searched for and find phrasing which avoids such filters. Therefore the need for haphazard or cumbersome manual monitoring may persist.

SUMMARY OF THE INVENTION

It is an object of the present invention to provide a system and a method for classifying images pertaining to usage of a computing resource using an ensemble of close ended questions and a model comprising conversational language model.

According to an aspect of some embodiments of the present invention there is provided a method for classifying images by content, comprising:
  acquiring a plurality of images pertaining to computer resource usage of a user;
  detecting a plurality of patches pertaining to a textual content in the plurality of images;
  extracting the textual content from the plurality of patches;
  processing the textual content to generate a plurality of queries;
  generating at least one compliance evaluation of the textual content to a usage policy by applying a model comprising a conversational language model on the plurality of queries; and
  outputting a compliance measure of the computer resource usage of a user using at least one compliance evaluation.

According to an aspect of some embodiments of the present invention there is provided a system comprising a storage and at least one processing circuitry configured to:
  acquire a plurality of images pertaining to computer resource usage of a user;
  detect a plurality of patches pertaining to a textual content in the plurality of images;
  extract the textual content from the plurality of patches;
  process the textual content to generate a plurality of queries;
  generate at least one compliance evaluation of the textual content to a usage policy by applying a model comprising a conversational language model on the plurality of queries; and
  output a compliance measure of the computer resource usage of a user using at least one compliance evaluation.

According to an aspect of some embodiments of the present invention there is provided one or more computer program products comprising instructions for classifying images by content, wherein execution of the instructions by one or more processors of a computing system is to cause a computing system to:
  acquire a plurality of images pertaining to computer resource usage of a user;
  detect a plurality of patches pertaining to a textual content in the plurality of images;
  extract the textual content from the plurality of patches;
  process the textual content to generate a plurality of queries;
  generate at least one compliance evaluation of the textual content to a usage policy by applying a model comprising a conversational language model on the plurality of queries; and
  output a compliance measure of the computer resource usage of a user using at least one compliance evaluation.

Optionally, the plurality of images are screen shots captured according to a timing policy.

Optionally, processing the textual content comprising:
  accessing a storage to obtain a plurality of close ended questions; and
  generating the plurality of queries each from a combination of the textual content and one of the plurality of close ended questions.

Optionally, the model comprises obtaining at least one relevance evaluation corresponding to at least one subject by feeding a plurality of inferences generated by the conversational language into a decision model.

Optionally, the plurality of close ended questions pertaining to the at least one subject.

Optionally, the at least one subject comprising a white list of subjects allowed by the computer resource usage policy.

Optionally, the at least one subject comprising a black list of subjects restricted by the computer resource usage policy.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings and formulae. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to text classification, and, more particularly, but not exclusively, monitoring computing resource usage by processing images using a model comprising a conversational language models.

Some embodiments of the present invention may capture at least one screenshot pertaining to the computing resource, detect content such as text displayed in the screenshot, and extract it, for example using OCR, feed a language model with queries prepared using an ensemble of close ended questions on the text extracted, and process inferences from the language model to classify the text.

Some embodiments of the present invention may additionally or alternatively capture images pertaining to computing storage, communication, and/or the like.

Some embodiments of the present invention may additionally may pack and/or pre-process the text to improve the likelihood queries based there are processed correctly and reduce error rate. Pre-processing may comprise translation and filter text for known weaknesses of a translation and/or a conversational language model.

Some embodiments of the present invention feed a large conversational language model trained for various purposes which may not necessarily comprise text classification according to subjects, with queries prepared using an ensemble of close ended questions on a text extracted from a document, a clip, a recording, and/or the like to be classified, and process inferences from the language model to classify the text.

Some embodiments of the present invention enable automatic monitoring, require lesser human intervention, consistent monitoring, monitoring biases, and provide a method for balancing security with privacy.

Some embodiments of the present invention may provide accuracy improvement using different formulation for questions, and provide high accuracy based on weaker assumptions on the language model strength.

Some embodiments of the present invention receive images, capture screenshots, or apply extraction thereof form a video, camera and/or the like.

Some embodiment of the present invention wrap the text with queries prepared for a classification, and apply a pre-trained conversational language mode, which may be transformer neural network based, in the wrapped text.

Some embodiment of the present invention extract closed ended inferences from a text generated by the model, and apply a preset function or an additional machine learning model to produce classification of the text.

Before explaining at least one embodiment of the invention in detail, it is to be understood that the invention is not necessarily limited in its application to the details of instructions and the arrangement of the components and/or methods set forth in the following description and/or illustrated in the drawings and/or the Examples. The invention is capable of other embodiments or of being practiced or carried out in various ways.

Figure 1:
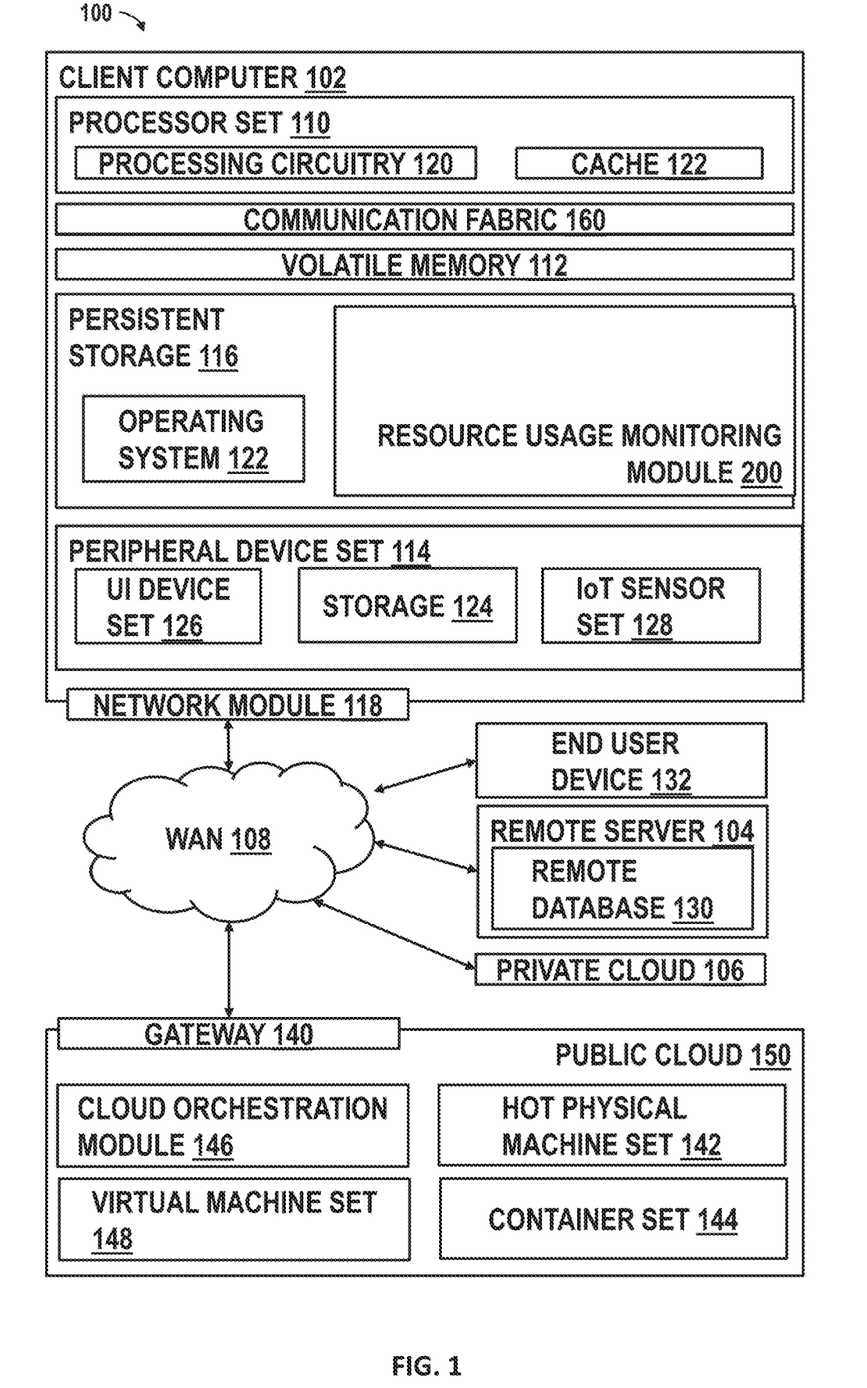
FIG. 1 is a schematic illustration of an exemplary system for classifying images pertaining to usage of a computing resource, according to some embodiments of the present disclosure.
Figure 3:
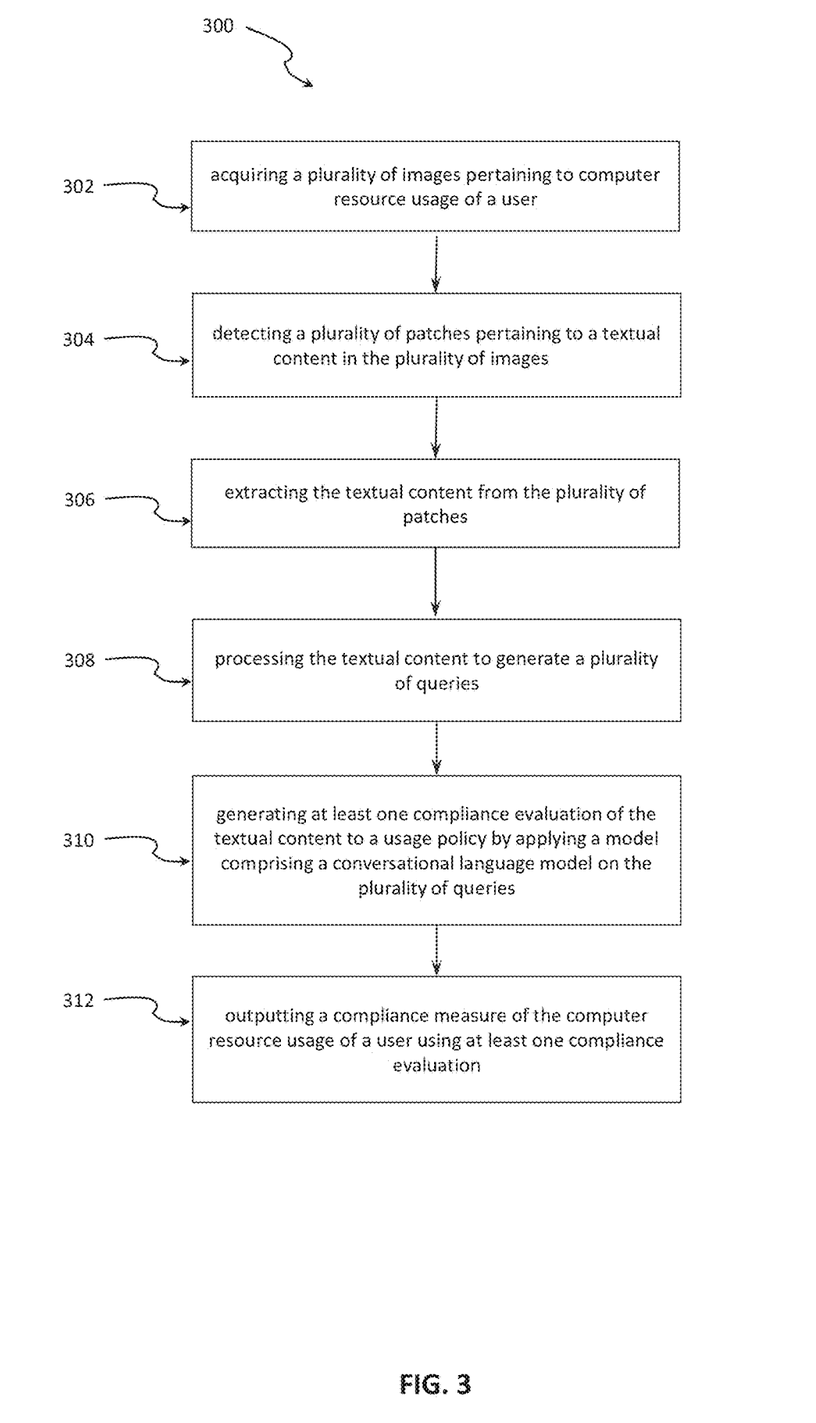
FIG. 3 is a flowchart of an exemplary process for classifying images pertaining to usage of a computing resource, according to some embodiments of the present disclosure.

Referring now to the drawings, FIG. 1 is a schematic illustration of an exemplary system for classifying images pertaining to usage of a computing resource classification, according to some embodiments of the present disclosure. An exemplary client computer system 100 may be used for executing execute processes such as 300 for text classification. Further details about these exemplary processes follow as FIG. 3 are described.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations may be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as a resource usage monitoring module 200. In addition to block 200, computing environment 100 includes, for example, computer 102, wide area network (WAN) 108, end user device (EUD) 132, remote server 104, public cloud 150, and private cloud 106. In this embodiment, computer 102 includes processor set 110 (including processing circuitry 120 and cache 134), communication fabric 160, volatile memory 112, persistent storage 116 (including operating system 122 and block 200, as identified above), peripheral device set 114 (including user interface (UI), device set 126, storage 124, and Internet of Things (IoT) sensor set 128), and network module 118. Remote server 104 includes remote database 130. Public cloud 150 includes gateway 140, cloud orchestration module 146, host physical machine set 142, virtual machine set 148, and container set 144.

COMPUTER 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

PROCESSOR SET 110 includes one, or more, computer processors of any type now known or to be developed in the future. For example, a processor set may include one or more of a central processing unit (CPU), a microcontroller, a parallel processor, supporting multiple data such as a digital signal processing (DSP) unit, a graphical processing unit (GPU) module, and the like, as well as optical processors, quantum processors, and processing units based on technologies that may be developed in the future. Processing circuitry 120 may be distributed over multiple packages, for example, multiple, coordinated integrated circuit chips. Processing circuitry 120 may implement multiple processor threads and/or multiple processor cores. Cache 134 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 102 to cause a series of operational steps to be performed by processor set 110 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 134 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 116.

COMMUNICATION FABRIC 160 is the signal conduction paths that allow the various components of computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 102, the volatile memory 112 is located in a single package and is internal to computer 102, but, alternatively or additionally, the volatile memory may be distributed over multiple packages and/or located externally with respect to computer 102.

PERSISTENT STORAGE 116 is any form of non-volatile storage for computers that is now known or to be developed in the future. The non-volatility of this storage means that the stored data is maintained regardless of whether power is being supplied to computer 102 and/or directly to persistent storage 116. Persistent storage 116 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 126 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. IoT sensor set 128 is made up of sensors that can be used in Internet of Things applications. For example, one sensor may be a thermometer and another sensor may be a motion detector.

NETWORK MODULE 118 is the collection of computer software, hardware, and firmware that allows computer 102 to communicate with other computers through WAN 108. Network module 118 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 118 are performed on the same physical hardware device. In other embodiments (for example, embodiments that utilize software-defined networking (SDN)), the control functions and the forwarding functions of network module 118 are performed on physically separate devices, such that the control functions manage several different network hardware devices. Computer readable program instructions for performing the inventive methods can typically be downloaded to computer 102 from an external computer or external storage device through a network adapter card or network interface included in network module 118.

WAN 108 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 132 is any computer system that is used and controlled by an end user (for example, a customer of an enterprise that operates computer 102), and may take any of the forms discussed above in connection with computer 102. EUD 132 typically receives helpful and useful data from the operations of computer 102. For example, in a hypothetical case where computer 102 is designed to provide a recommendation to an end user, this recommendation would typically be communicated from network module 118 of computer 102 through WAN 108 to EUD 132. In this way, EUD 132 can display, or otherwise present, the recommendation to an end user. In some embodiments, EUD 132 may be a client device, such as thin client, heavy client, mainframe computer, desktop computer and so on.

REMOTE SERVER 104 is any computer system that serves at least some data and/or functionality to computer 102. Remote server 104 may be controlled and used by the same entity that operates computer 102. Remote server 104 represents the machine(s) that collect and store helpful and useful data for use by other computers, such as computer 102. For example, in a hypothetical case where computer 102 is designed and programmed to provide a recommendation based on historical data, then this historical data may be provided to computer 102 from remote database 130 of remote server 104.

PUBLIC CLOUD 150 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 150 is performed by the computer hardware and/or software of cloud orchestration module 146. The computing resources provided by public cloud 150 are typically implemented by virtual computing environments that run on various computers making up the computers of host physical machine set 142, which is the universe of physical computers in and/or available to public cloud 150. The virtual computing environments (VCEs) typically take the form of virtual machines from virtual machine set 148 and/or containers from container set 144. It is understood that these VCEs may be stored as images and may be transferred among and between the various physical machine hosts, either as images or after instantiation of the VCE. Cloud orchestration module 146 manages the transfer and storage of images, deploys new instantiations of VCEs and manages active instantiations of VCE deployments. Gateway 140 is the collection of computer software, hardware, and firmware that allows public cloud 150 to communicate through WAN 108.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 150, except that the computing resources are only available for use by a single enterprise. While private cloud 106 is depicted as being in communication with WAN 108, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 150 and private cloud 106 are both part of a larger hybrid cloud.

Figure 2:
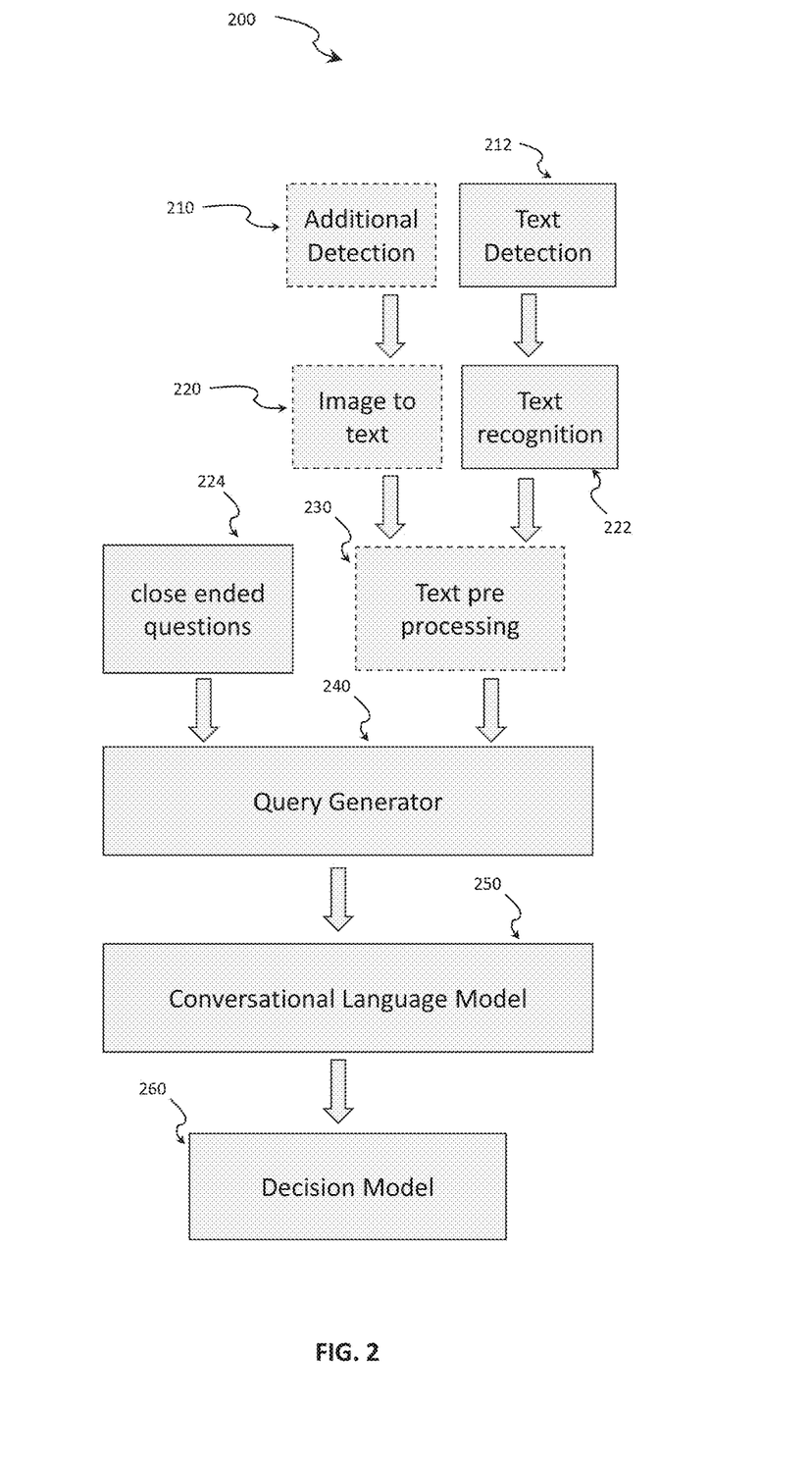
FIG. 2 is a schematic diagram of a simplified exemplary module for classifying images pertaining to usage of a computing resource, according to some embodiments of the present disclosure.

Referring now to FIG. 2, which is a schematic diagram of a simplified exemplary computing resource usage monitoring module, according to some embodiments of the present disclosure.

The diagram describes the primary essential and an optional architectural component of the resource usage monitoring module 200 for monitoring the computing resource usage pertaining to one or more users.

One or more images may be captured as screenshot pertaining to a display comprised in the UI device set 126, from applications used for image generation or viewing, email communication, sampled from files on the storage 124 or received from the network module 118, for example when the resource usage monitoring is performed on a computer separate from the resource whose usage in monitored, or when the monitoring is not done in real time. Images or clips may be received from an end user device 132, the public cloud 150, and/or the like, as long as they are connected to the computing resource monitored.

Optionally, some implementations may comprise additional detection module 210 which may search for logos, images, ornamental text, and/or the like.

The text detection 212 may detect text windows or frames using a variety of methods. Some implementations may use Convolutional Neural Networks (CNNs), deep learning models that may detect text in images with high accuracy. Implementations may predict a set of bounding boxes and their corresponding probabilities of contain text, or other objects of interest for the additional detection module. The convolutional neural network may be trained on a large dataset of images and their associated annotations. Some implementations may partition images into grids of cells and detect a number of bounding boxes and class such as language probabilities for each cell. Some methods may also comprise handcrafted features such as stroke width, edge orientation, and color contrast to detect text regions in images.

Some methods may detect regions in an image that have stable boundaries under varying thresholds of intensity, or trace connectivity of pixels in the image. Some methods may combine two or more text detection techniques.

Implementations comprising block 210 may comprise image to text module 220. This module may classify one or more objects in an associated frame or region, and output a textual description thereof. Objects of interest may be characterized by types of images such as a photo, a painting, a map, a schematic diagram, a medical image, and/or the like. Other objects of interest may be trees, faces, other human body parts, animals, furniture, clothes, food, vehicle, machinery, appliances, and/or the like. Other objects of interest may be symbols, logos and trademarks.

The text recognition 222 may interpret the text within the extracted text regions. The text recognition module may utilize Optical Character Recognition (OCR) technology, which is a process for converting images of typed, handwritten, or printed text into machine-readable text. OCR technology may be based on methods such as pattern recognition, feature extraction, machine learning, other methods of artificial intelligence, and/or the like.

The close ended questions 224 may pertain to subjects be based on one or more lists of subject to classify when the text is typical for allowed used of the computing resource, or indicate a misuse thereof. The plurality of close ended questions may be based on one or more domain knowledge checklists, subject lists, and/or the like.

In some implementations, the plurality of close ended questions comprises one or more ensembles of close ended questions which relate to a similar subject.

In some implementations, the plurality of close ended questions comprise pairs, trios, and/or larger sets of synonymous, or near synonymous questions, for reducing the risk of mistakes by the model. Other questions may be partially overlapping to existing ones in the question list.

Some implementations may have a checklists which are whitelist of subjects, activities, or the like for which the computer resource is supplied, and thus are allowed by the computer resource usage policy, and a blacklist of subjects which are restricted by the computer resource usage policy and may violate the terms of usage. Some implementations may also have a gray-list of subjects which are allowed to a certain extent, or tolerated despite of not being related to what the computer resource is made accessible for. For example, it may be allowed to order food before a lunch break, or read news occasionally.

Some checklists may comprise questions for making sure taboo subjects are not present. culturally or socially sensitive topics that are preferably avoided such as physical personal issues, medical conditions, mortality, religion, politics, race and ethnicity, substance abuse and addiction, social status, unlawful deeds, judgement about appearance or body, personal finance, family issues, and/or the like. These may be examples of close ended questions comprising binary. Yes/No question.

Other checklists may relate to information not expected to be accessible, and/or that may be indicative of a security breach. Text indicating ransom demand, for example, may not indicate a deliberate violation by the user, however may still call for attention. It should be stated that examples provide here may relate to some policies, while other policies may lead to different meanings in different policies. For example, it is expected that text from a screenshot from a device used by a police detective in professional context, or a criminology student will mention illegal activities, while a screenshot from a device used by a biology student may be more suspicious when such text is found therein.

Examples of questions that may cause positive answers for subjects not compliant with a policy may comprise "Does the text contain taboo subjects", "Does it mention a fictional character?", "Is the text related to political controversies?", "Is the text entertaining?", "is the text associated with a computer game", "are movie subtitles present in the text?", "is it related to stock exchange" and "Does the document mention alcoholic beverages?".

Examples of questions that may be allowed or even expected to be positive for some use context, but not in others, may include "Does it include a secrecy indication?", "Are here chemical terms mentioned in?", "Does it list email address?", "Does it mention any customer or supplier name?", "Does the text discuss legal issues, lawsuits, legal claims or violations of contracts?", "Does the text discuss intellectual property matters?", "Does the text discuss or mention company names or product names?", "Does the short text mention negotiations, pricing, discounts?", and "Does the document mention medications?".

Examples of questions that may be contained in grey-lists, i.e. allowed to be positive but may indicate a problem if positive too often, may include "Is the text related to food", or "Is it related to traffic".

Some implementations may comprise text preprocessing module 230 which may convert raw text to text that can be processed by a conversational language model more reliably.

Some implementation may apply cleanup, for example removing or correcting obvious typos or word parts.

Some implementations of the disclosure, for example those may be adapted for languages other than English, some of which have lesser representation in available training data, and thus handled less effectively, may comprise a module for translating the textual content from some languages to one or more other languages.

Some implementations may further comprise domain specific adaptations, such as for frequently used acronyms, abbreviations, jargon, local slang, deliberate typos used to avoid text filters and/or the like.

The query generator 240 is used for generating a plurality of queries each from a combination of the textual content and one of the plurality of close ended questions.

For example, when the text is "Hi Danielle, what do you want to order for lunch", some queries to the model may be "Does the text 'Hi Danielle, what do you want to order for lunch' contain controversial words", "Does the text 'Hi Danielle, what do you want to order for lunch' mention chemical terms", and/or the like.

Some implementation may split the text to several, partially overlapping and/or non-overlapping parts, and generate queries by applying some or all of the plurality of close ended questions on these parts. In some example the option to break textual contents into separate, potentially overlapping text parts such as sentences, paragraphs and/or the like, and ask the closed ended questions on those and then merge the results in the decision module may improve accuracy and robustness, since large language models may have weaknesses. Some implementations may apply parsing based on end of paragraph indications such as newline, a period at a sentence end, a comma, and/or the like. Some implementations of large language models may omit one or more references from the processing of comparatively long documents, and splitting documents to paragraphs, sentences, or parts thereof may reduce the risk of skipping a reference.

Other methods of merging text with questions may be used, such as, combining in an embedding space.

The conversational language model 250 may be an artificial intelligence module designed to generate text based on a given prompt or input. The model may be an incorporated in house or third party machine learning model, which was trained on a large corpus of text and may use deterministic or statistical techniques to generate outputs that are coherent, contextually relevant and semantically meaningful. The language model may be designed to analyze a natural language text and generate responses such as those expected in human conversation. The conversational language may be trained specifically for text classification, however models trained for variety of applications, such as chat-bots, virtual assistants, private tutor or psychotherapist emulation and customer service systems may also be used.

Conversational and other generative language models may be powered by advanced machine learning techniques, such as neural networks, and may be fine-tuned to perform specific tasks or to generate outputs in specific domains. Conversational language models may comprise components such as generative transformer network, for example for embedding a word placement in a sentence. Some generative language models comprise one or more autoregressive components, however deterministic methods may also be used.

The models may also be integrated into other systems to provide enhanced capabilities, such as improved natural language processing, text generation, and dialogue management. Followingly, the inferences from the language model may be acquired to form a structure to feed into a decision model to acquire a classification of the textual content.

The decision model 260 my receive a plurality of inference values, each generated by feeding one of the plurality of queries to the conversational language model, and process them to infer the text class. Which may be output as an indication of the classification in association with the textual content.

Some inferences may be binary, for example, "on policy" or "violates policy". Other examples may have an inference of multiple possible values. Some implementations generate a relevance evaluation corresponding to a whitelist and/or a blacklist of subjects by feeding the plurality of inferences generated by the conversational language into the decision model An example may infer "perfectly on topic", when at most 5% of the texts extracted had at least two question pertaining to the usage of the computer resource by the usage indicated a grey-list subject by the block 250, and at most 1% indicated blacklist subject, probably due to model error. Additional inferences may include "mostly on topic" for 5% to 20% of the texts having questions indicating a grey-list subject therein, "often off topic" for 20% to 70%, "off topic" to above 70% and "severe violation" when at least 10% of the texts extracted had at least two question pertaining to the usage of the computer resource by the usage indicated a blacklist subject by the block 250.

Some implementations may be checklist based, and a rule such as "when three or more answers regarding a blacklist subject in at least two images are positive, indicate the text is taboo and the user violated the terms, otherwise indicate as safe".

It should be noted that these numbers are exemplary and may be adjusted according to actual model performance and other considerations such as management, legislation, and/or the like.

Some other implementations may comprise a classifying machine learning model, i.e. based on an additional machine learning model trained on labelled examples, and/or using other training methods such as active learning to allow less investment in supervision or clustering.

Referring now to FIG. 3, which is a flowchart of an exemplary process for classifying images pertaining to usage of a computing resource, according to some embodiments of the present disclosure.

The processing circuitry 120 may execute the exemplary process 300 for a variety of policies for academic institutions, web service providers, hackathon facilitators, hospitals, schools, commercial companies, financial institutions, technology research centers, and/or the like. Some implementations of the process may be executed on the device providing the computing resource to the user monitored.

Alternatively, the process 300 or parts thereof may be executing using a remote system, on the private cloud 106 or public clod 150, an auxiliary system, and/or the like.

The exemplary process 300 starts, as shown in 302, with acquiring a plurality of images pertaining to computer resource usage of a user. Some implementations capture the plurality of images as screen shots according to a timing policy. The images may be one or more screenshots taken periodically, in random or pseudo random timing, at predetermined times, or by a hybrid policy. Additionally or alternatively, images may be captured, additionally or alternatively, from applications, chat or direct messages, email attachments, and/or the like.

The images may be received by the system from a display comprised by the UI device set 126, network module 118, or other data input mechanism. The received text may be stored in volatile memory 112, cache, 122 peripheral storage 124, or the like, to be processed by the system for various applications, such as natural language processing based text classification.

The exemplary process 300 continues, as shown in 304, with detecting a plurality of patches pertaining to a textual content in the plurality of images.

Images such as screenshots frequently contain windows of text. These windows may be detected, for example by block 212, or received through other methods. Some examples of other methods include OpenCV's EAST text detection model to detect the presence of text in an image. The text Region of Interest (ROI) may then be extracted from the image using basic image cropping or array slicing.

The exemplary process 300 continues, as shown in 306, with extracting the textual content from the plurality of patches, for example by block 222 on patches detected by 212.

Some implementations may also extract meaning from graphics, symbols, logos, and/or the like, for example by using an additional detection block 210 and converting the image to text using transformer networks, convolutional networks, random forests, or other classification methods.

The textual content found in one or more patches from one or more images may be concatenated to a string or stored on a separate array, a list an XML, and/or the like, using storage 124 for example.

The exemplary process 300 continues, as shown in 308, with processing the textual content to generate a plurality of queries.

Some implementations comprise accessing a storage such as 112, 116 or 124 to obtain a plurality of close ended questions, and generating the plurality of queries each from a combination of the textual content and one of the plurality of close ended questions.

The queries may generated by a query generator such as 240, and may combine some or all of the questions from a plurality of close ended questions such as 224 with parts or all of the text extracted from the images. The plurality of queries may be represented in comma separated value files, a list or array of strings, and/or the like, and each query may be in ASCII format, however Unicode, embedding, and other representations may be used.

The plurality of close ended questions, for example 224, may be obtained from on volatile memory 112, peripheral storage 124, remotely on a private cloud 106, on non-volatile memory and/or the like. The close ended questions may be binary (Yes/No) or multiple choice, and may form a checklist or be related in any arbitrary manner, or apparent lack of relations.

The exemplary process 300 continues, as shown in 310, with generating at least one compliance evaluation of the textual content to a usage policy by applying a model comprising a conversational language model on the plurality of queries.

The conversational language model may be executed by the processor set 110, or remotely on the private cloud 106, or the public cloud 150, and/or the like.

The conversational language model such as 250 may be models such as or based on Generative Pretrained Transformer (GPT), Conditional Transformer Language Model (CTRL), Text-to-Text Transfer Transformer (T5), Recurrent neural networks (RNN), Generative Adversarial Networks (GANs), variational autoencoders, and/or the like, as well as models that are expected to be developed. Some implementations may also comprise a knowledge representation based module, which may be deterministic or stochastic. The conversational language model may generate answers which comprise one of a plurality of answers such as "Yes" and "No", a number in a range, and/or the like, and these inferences may be fed directly or filtered to a decision model.

Usage policy may be defined in accordance to documents that provide employees, students, customers, and/or the like with guidelines on how to appropriately use the computing equipment, internet access, and/or the likes, provided there to for designated tasks. These policies may limit access to known sites, downloading certain files, refraining from using the computer system for different purposes, and/or the like. Using the internet access for illegitimate activities, causing computers to be infected by viruses, worms or other malicious software, and sending offensive or inappropriate emails to customers, colleagues or partners may be considered severe violations.

The compliance evaluation may be performed for example by block 260, however other methods may be applied. Answers from the conversational language model 250, and optionally other parts of the model, may be weighted and combined according to different policies, for example allowing users some slack, or taking onto consider wrong inferences by components of the model.

And subsequently, as shown in 312, the process 300 may continue by outputting a compliance measure of the computer resource usage of a user using at least one compliance evaluation. The compliance measure may be transmitted to a supervisor machine, logged, displayed on a monitor, trigger an associated sound, opening a dialog box, and/or the like on the local machine, or through one or more other machines accessible through the network module 118. The compliance measure may be provided as confidence score, a label such as "compliant" or "incompliant", a warning when a severe violation is detected, and/or the like.

Figure 4:
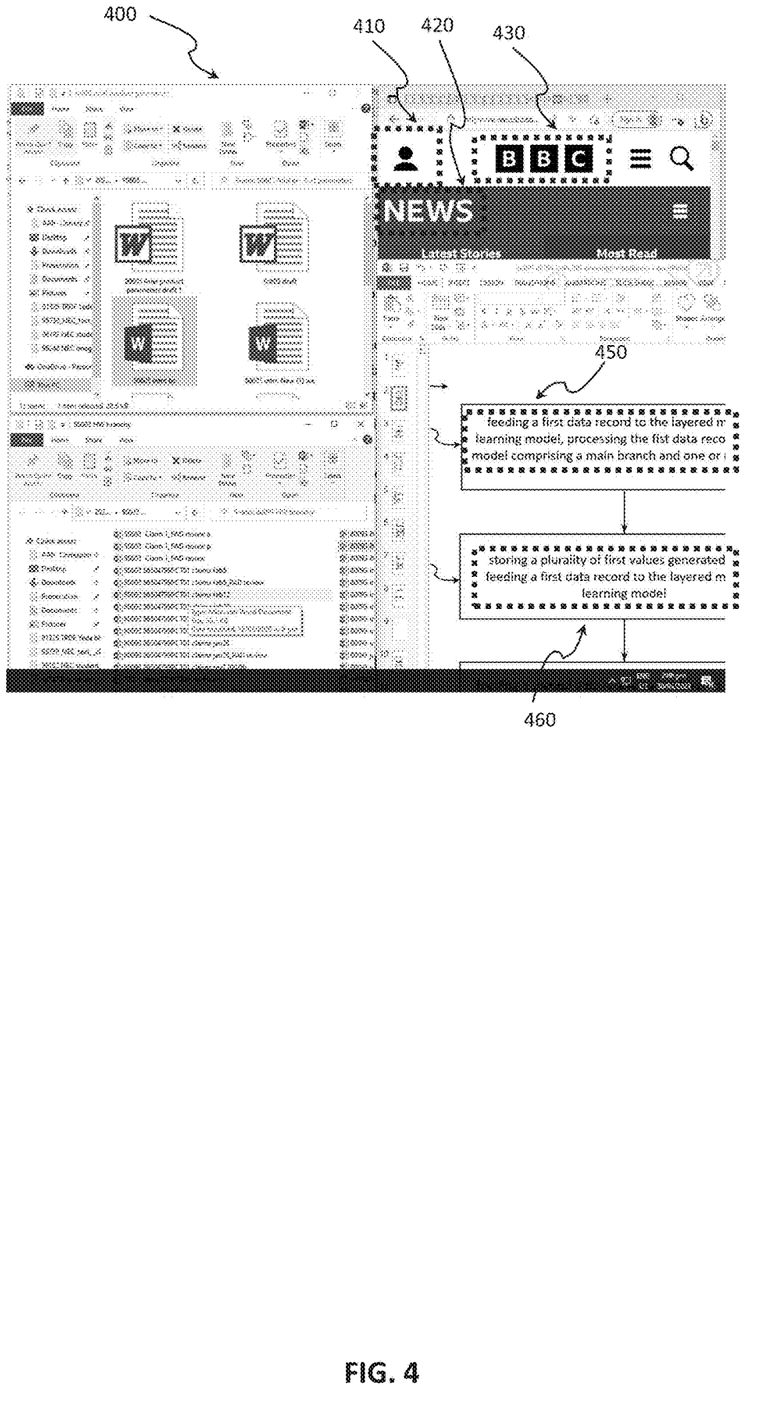
FIG. 4 is an exemplary screenshot captured with an exemplary plurality of patches pertaining to a textual content according to some embodiments of the present disclosure.

Referring now to FIG. 4, which is an exemplary screenshot captured with an exemplary plurality of patches pertaining to a textual content according to some embodiments of the present disclosure.

The screenshot 400 may be captured from a memory used by the display of the UI device set 126, or from a storage such as 124.

Some exemplary the regions detected include 410, where a symbol which may be translated to a textual description such as "a simplified silhouette of human upper body" may be used to describe it.

The word "NEWS" may be found in 420. The British Broadcasting Service (BBC) logo may be identified in 430.

The text in 450 may be detected as "feeding a first data record to the layered machine learning model, processing the fist data record by the model comprising a main branch and one or more side branches" While "storing a plurality of first values generated when feeding a first data record to the layered machine learning model" may be found in 460.

Some implementation may generate one string from all of the texts. Others may generate a set of five strings, each to an associated frame. Other implementations may generate one string from each group of frames, for example one from 410, 420 and 430, and one from 450 and 460, while others may divide the last to two separate shorter string. Some implementations may find fewer or additional text frames in the image.

It should be noted that this is an exemplary image and the disclosure is not limited to screenshots or parts thereof, and may be used on other types of images, such as images taken by a camera.

Figure 5:
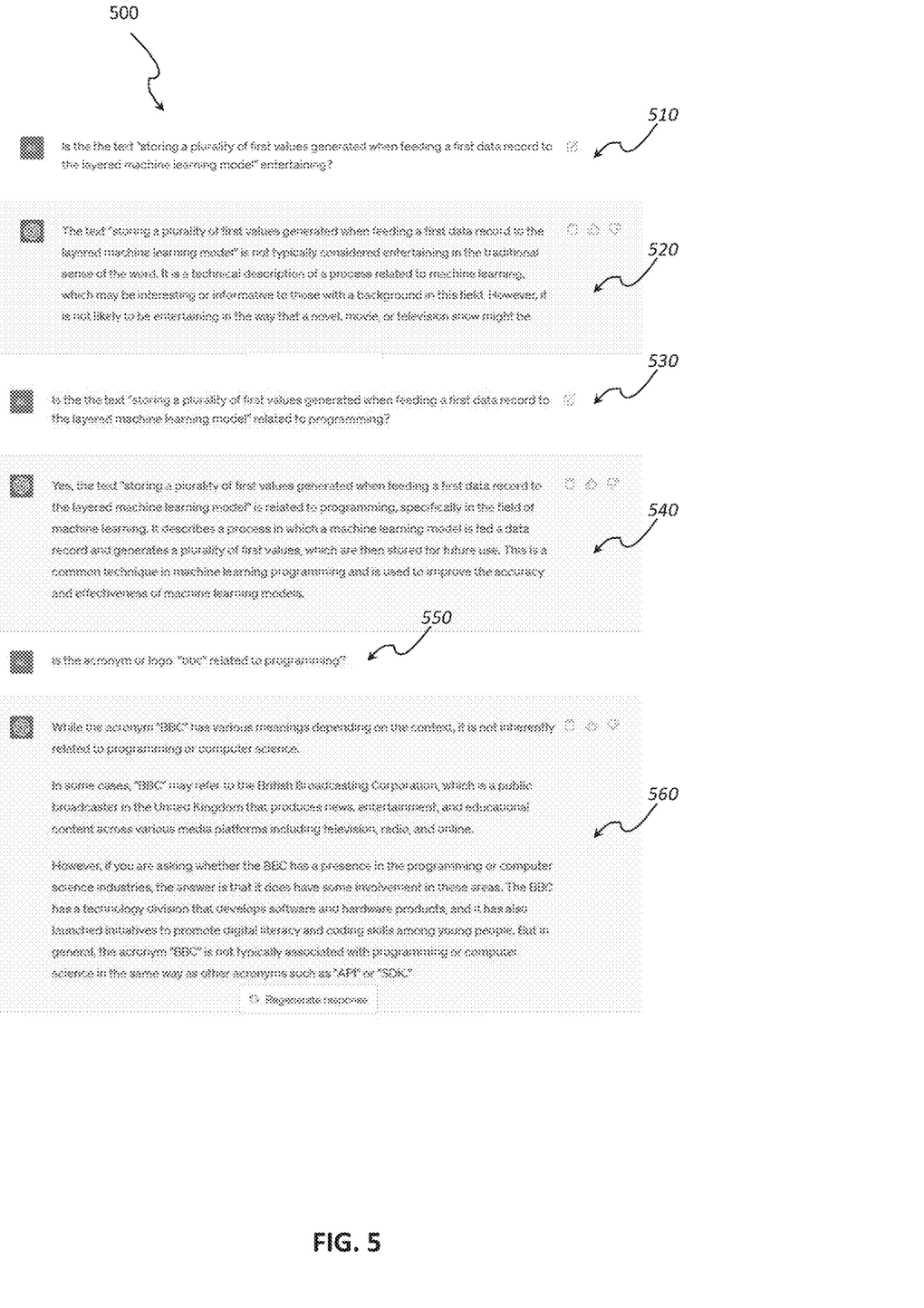
FIG. 5 shows some exemplary queries on exemplary textual contents on a conversational language model, according to some embodiments of the present disclosure.

Referring now to FIG. 5, which shows some exemplary queries on exemplary textual contents on a conversational language model, according to some embodiments of the present disclosure.

As shown in 500 the queries are applied on the exemplary conversational language model GPT. The query 510 based on 460 causes the conversational language model to generate an answer 520, indicating the text is not likely to indicate the computing resource is used for entertainment. Note that some post processing may be required for converting 520 to a binary value or a confidence measure, however refinement of the open ended question, for example to ask for a "Yes" or "No", or a likelihood in percent, in the beginning may solve this issue.

The query 530 may be used when the computing resource is provided to a programmer by an employer, and the answer 540 indicates the text is indeed likely to be associated with computer programming.

The query 550 may also be used when the computing resource is provided to a programmer by an employer, and the answer 560 indicates that while some programming is likely done for the organization, it is not likely the computer user views the BBC logo for that purpose, but rather is more likely to be off topic reading news.

It should be noted that these queries are a simplified, partial example provided for illustration, and different, larger sets of questions may be used in implementations.

It is expected that during the life of a patent maturing from this application many relevant conversational language models, text media, and representation methods will be developed and the scope of the terms conversational language models machine learning model, text, and embedding are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for classifying images by content, comprising:
   acquiring a plurality of images pertaining to computer resource usage of a user;
   detecting a plurality of patches pertaining to a textual content in the plurality of images;
   extracting the textual content from the plurality of patches;
   processing the textual content to generate a plurality of queries;
   generating at least one compliance evaluation of the textual content to a usage policy by applying a model comprising a conversational language model on the plurality of queries; and
   outputting a compliance measure of the computer resource usage of a user using at least one compliance evaluation;
   wherein processing the textual content comprising:
   accessing a storage to obtain a plurality of close ended questions; and
   generating the plurality of queries each from a combination of the textual content and one of the plurality of close ended questions.

2. The method of claim 1 wherein the plurality of images are screen shots captured according to a timing policy.

3. The method of claim 1 wherein the model comprises obtaining at least one relevance evaluation corresponding to at least one subject by feeding a plurality of inferences generated by the conversational language into a decision model.

4. The method of claim 3 wherein the plurality of close ended questions pertaining to the at least one subject.

5. The method of claim 3 wherein the at least one subject comprising a white list of subjects allowed by the computer resource usage policy.

6. The method of claim 3 wherein the at least one subject comprising a black list of subjects restricted by the computer resource usage policy.

7. A system comprising a storage and at least one processing circuitry configured to:
- acquire a plurality of images pertaining to computer resource usage of a user;
  - detect a plurality of patches pertaining to a textual content in the plurality of images;
  - extract the textual content from the plurality of patches;
  - process the textual content to generate a plurality of queries;
- generate at least one compliance evaluation of the textual content to a usage policy by applying a model comprising a conversational language model on the plurality of queries; and
- output a compliance measure of the computer resource usage of a user using at least one compliance evaluation;
- wherein processing the textual content comprising:
- accessing a storage to obtain a plurality of close ended questions; and
- generating the plurality of queries each from a combination of the textual content and one of the plurality of close ended questions.

8. The system of claim 7 wherein the plurality of images are screen shots captured according to a timing policy.

9. The system of claim 7 wherein the model comprises obtaining at least one relevance evaluation corresponding to at least one subject by feeding a plurality of inferences generated by the conversational language into a decision model.

10. The system of claim 9 wherein the plurality of close ended questions pertaining to the at least one subject.

11. The system of claim 9 wherein the at least one subject comprising a white list of subjects allowed by the computer resource usage policy.

12. The system of claim 9 wherein the at least one subject comprising a black list of subjects restricted by the computer resource usage policy.

13. One or more computer program products comprising instructions for classifying images by content, wherein execution of the instructions by one or more processors of a computing system is to cause a computing system to:
- acquire a plurality of images pertaining to computer resource usage of a user;
  - detect a plurality of patches pertaining to a textual content in the plurality of images;
  - extract the textual content from the plurality of patches;
  - process the textual content to generate a plurality of queries by at least:
    - accessing a storage to obtain a plurality of close ended questions, and
    - generating the plurality of queries each from a combination of the textual content and one of the plurality of close ended questions;
- generate at least one compliance evaluation of the textual content to a usage policy by applying a model comprising a conversational language model on the plurality of queries; and
- output a compliance measure of the computer resource usage of a user using at least one compliance evaluation.

* * * * *